(12) United States Patent
Dere et al.

(10) Patent No.: US 9,787,731 B2
(45) Date of Patent: Oct. 10, 2017

(54) DYNAMICALLY DETERMINING WORKSPACE BOUNDS DURING A COLLABORATION SESSION

(71) Applicant: SMART Technologies ULC, Calgary (CA)

(72) Inventors: Colin Dere, Calgary (CA); Elmar Manarang, Calgary (CA); Erica Arnoldin, Calgary (CA); Kathryn Rounding, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 0 days.

(21) Appl. No.: 14/672,839

(22) Filed: Mar. 30, 2015

(65) Prior Publication Data

US 2015/0277656 A1    Oct. 1, 2015

Related U.S. Application Data

(60) Provisional application No. 61/972,795, filed on Mar. 31, 2014.

(51) Int. Cl.
*H04L 29/06* (2006.01)
*G06F 3/0484* (2013.01)
*G06F 3/042* (2006.01)

(52) U.S. Cl.
CPC .......... *H04L 65/403* (2013.01); *G06F 3/042* (2013.01); *G06F 3/0425* (2013.01); *G06F 3/0484* (2013.01)

(58) Field of Classification Search
CPC ................ G06F 3/0484; G06F 3/0485; G06F 2203/0382; H04L 65/403
See application file for complete search history.

(56) References Cited

U.S. PATENT DOCUMENTS

| | | | |
|---|---|---|---|
| 5,448,263 A | 9/1995 | Martin | |
| 5,768,492 A * | 6/1998 | Schumer | G06F 3/0488 345/173 |
| 6,141,000 A | 10/2000 | Martin | |
| 6,337,681 B1 | 1/2002 | Martin | |
| 6,353,433 B1 * | 3/2002 | Schumer | G06F 3/0488 345/173 |
| 6,466,654 B1 * | 10/2002 | Cooper | G10L 15/26 379/88.01 |
| 6,747,636 B2 | 6/2004 | Martin | |
| 6,803,906 B1 | 10/2004 | Morrison et al. | |
| 7,219,302 B1 * | 5/2007 | O'Shaughnessy | G06F 3/04817 707/999.007 |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,502,752 B1 * | 3/2009 | Lemons | G06Q 20/108 370/354 |

(Continued)

*Primary Examiner* — Patrick F Marinelli
(74) *Attorney, Agent, or Firm* — King & Schikli, PLLC

(57) ABSTRACT

A method is described for dynamically determining session boundary coordinates within a canvas. As described, an initial explored area of the canvas is defined. The initial explored area is expanded. When the size of the expanded explored area of the canvas reaches a predefined maximum size, the explored area coordinates are set as the session boundary coordinates. A computing device and a non-transitory computer readable medium having instructions configured to implement the method are also described.

20 Claims, 6 Drawing Sheets

(56) References Cited

U.S. PATENT DOCUMENTS

| | | | | |
|---|---|---|---|---|
| 7,509,577 B2* | 3/2009 | Kuwata | G06F 9/543 | 709/203 |
| 7,801,743 B2* | 9/2010 | Graves | G06Q 50/22 | 705/2 |
| 8,063,890 B2* | 11/2011 | Fleck | G06F 3/0416 | 178/18.01 |
| 8,255,461 B1* | 8/2012 | Liu | H04M 3/567 | 709/203 |
| 8,370,433 B2* | 2/2013 | Conner | G06Q 10/10 | 709/204 |
| 8,577,972 B1* | 11/2013 | Heikes | H04L 51/04 | 709/206 |
| 8,581,958 B2* | 11/2013 | Baker | H04N 7/152 | 348/14.08 |
| 8,750,507 B2* | 6/2014 | Roosta | H04L 9/0833 | 380/255 |
| 8,806,024 B1* | 8/2014 | Toba Francis | G06F 17/30873 | 709/227 |
| 8,850,546 B1* | 9/2014 | Field | G06F 21/335 | 726/1 |
| 8,898,567 B2* | 11/2014 | Arrasvuori | G06F 1/1626 | 715/704 |
| 9,086,837 B1* | 7/2015 | Kang | G06F 3/016 | |
| 9,235,268 B2* | 1/2016 | Arrasvuori | G06F 3/017 | |
| 2002/0056003 A1* | 5/2002 | Goswami | G06F 9/54 | 709/227 |
| 2004/0179001 A1 | 9/2004 | Morrison et al. | | |
| 2004/0179036 A1* | 9/2004 | Teplov | G06F 3/1454 | 715/751 |
| 2010/0324997 A1* | 12/2010 | Evans | G06Q 30/02 | 705/14.69 |
| 2011/0022968 A1* | 1/2011 | Conner | G06Q 10/10 | 715/753 |
| 2011/0182426 A1* | 7/2011 | Roosta | H04L 9/0833 | 380/255 |
| 2011/0249024 A1* | 10/2011 | Arrasvuori | G06F 3/017 | 345/629 |
| 2011/0252320 A1* | 10/2011 | Arrasvuori | G06F 1/1626 | 715/704 |
| 2012/0054355 A1* | 3/2012 | Arrasvuori | G06Q 10/10 | 709/229 |
| 2012/0072052 A1* | 3/2012 | Powers | G05D 1/0044 | 701/2 |
| 2012/0151408 A1* | 6/2012 | Groth | G06F 3/0481 | 715/799 |
| 2013/0198653 A1* | 8/2013 | Tse | G06F 3/0484 | 715/751 |
| 2013/0238712 A1* | 9/2013 | Dearman | H04L 67/145 | 709/205 |
| 2014/0300565 A1* | 10/2014 | Anderson | A63F 13/06 | 345/173 |
| 2015/0149958 A1* | 5/2015 | Voorhees | G06F 3/0485 | 715/798 |
| 2015/0277656 A1* | 10/2015 | Dere | G06F 3/042 | 345/156 |
| 2016/0085381 A1* | 3/2016 | Parker | G06F 3/0481 | 715/753 |
| 2016/0232646 A1* | 8/2016 | Carlos | G06F 3/1454 | |
| 2016/0232647 A1* | 8/2016 | Carlos | G06F 3/1454 | |
| 2016/0328098 A1* | 11/2016 | Santhakumar | G06F 9/4445 | |
| 2016/0328114 A1* | 11/2016 | Santhakumar | G06F 9/4445 | |

* cited by examiner

DYNAMICALLY DETERMINING WORKSPACE BOUNDS DURING A COLLABORATION SESSION

The present invention relates generally to collaboration, and in particular to a method for dynamically determining workspace bounds during a collaboration session. This application claims priority from U.S. Provisional Application No. 61/972,795 filed Mar. 31, 2014.

BACKGROUND

Interactive input systems that allow users to inject input (e.g., digital ink, mouse events etc.) into an application program using an active pointer (e.g., a pointer that emits light, sound, or other signal), a passive pointer (e.g., a finger, cylinder or other suitable object) or other suitable input devices such as for example, a mouse, or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001, all assigned to SMART Technologies of ULC of Calgary, Alberta, Canada, assignee of the subject application, the entire disclosures of which are incorporated by reference; touch systems comprising touch panels employing electromagnetic, capacitive, acoustic or other technologies to register pointer input; tablet and laptop personal computers (PCs); smartphones; personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital imaging devices at its corners. The digital imaging devices have overlapping fields of view that encompass and look generally across the touch surface. The digital imaging devices acquire images looking across the touch surface from different vantages and generate image data. Image data acquired by the digital imaging devices is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a pointer touches the waveguide surface, due to a change in the index of refraction of the waveguide, causing some light to escape from the touch point. In such a multi-touch interactive input system, the machine vision system captures images including the point(s) of escaped light, and processes the images to identify the touch position on the waveguide surface based on the point(s) of escaped light for use as input to application programs.

The application program with which the users interact provides a canvas for receiving user input. The canvas is configured to be extended in size within its two-dimensional plane to accommodate new input as needed. As will be understood, the ability of the canvas to be extended in size within the two-dimensional plane as needed causes the canvas to appear to be generally infinite in size. Accordingly, managing the collaboration session may become burdensome, resulting in a diminished user experience.

It is therefore an object to provide a novel method of navigation during an interactive input session and a novel interactive board employing the same.

SUMMARY OF THE INVENTION

According to an aspect there is provided a method for dynamically determining session boundary coordinates within a canvas, the method comprising: determining an initial explored area of the canvas; expanding the initial explored area; and when the size of the expanded explored area of the canvas reaches a predefined maximum size, setting the explored area coordinates as the session boundary coordinates.

According to another aspect there is provided a computing device comprising: a communication interface for communicating with other computing devices; memory for storing instruction; and a processor configured to execute the instructions, which cause the computing device to: determine an initial explored area of the canvas; expand the initial explored area; and when the size of the expanded explored area of the canvas reaches a predefined maximum size, set the explored area coordinates as the session boundary coordinates.

According to another aspect there is provided a non-transitory computer readable medium having stored thereon instructions which, when executed by a computing device, cause the computing device to: determine an initial explored area of the canvas; expand the initial explored area; and when the size of the expanded explored area of the canvas reaches a predefined maximum size, set the explored area coordinates as the session boundary coordinates.

BRIEF DESCRIPTION OF THE DRAWINGS

Embodiments of the invention will now be described by way of example only with reference to the accompanying drawings in which.

DETAILED DESCRIPTION OF THE EMBODIMENTS

Figure 1:
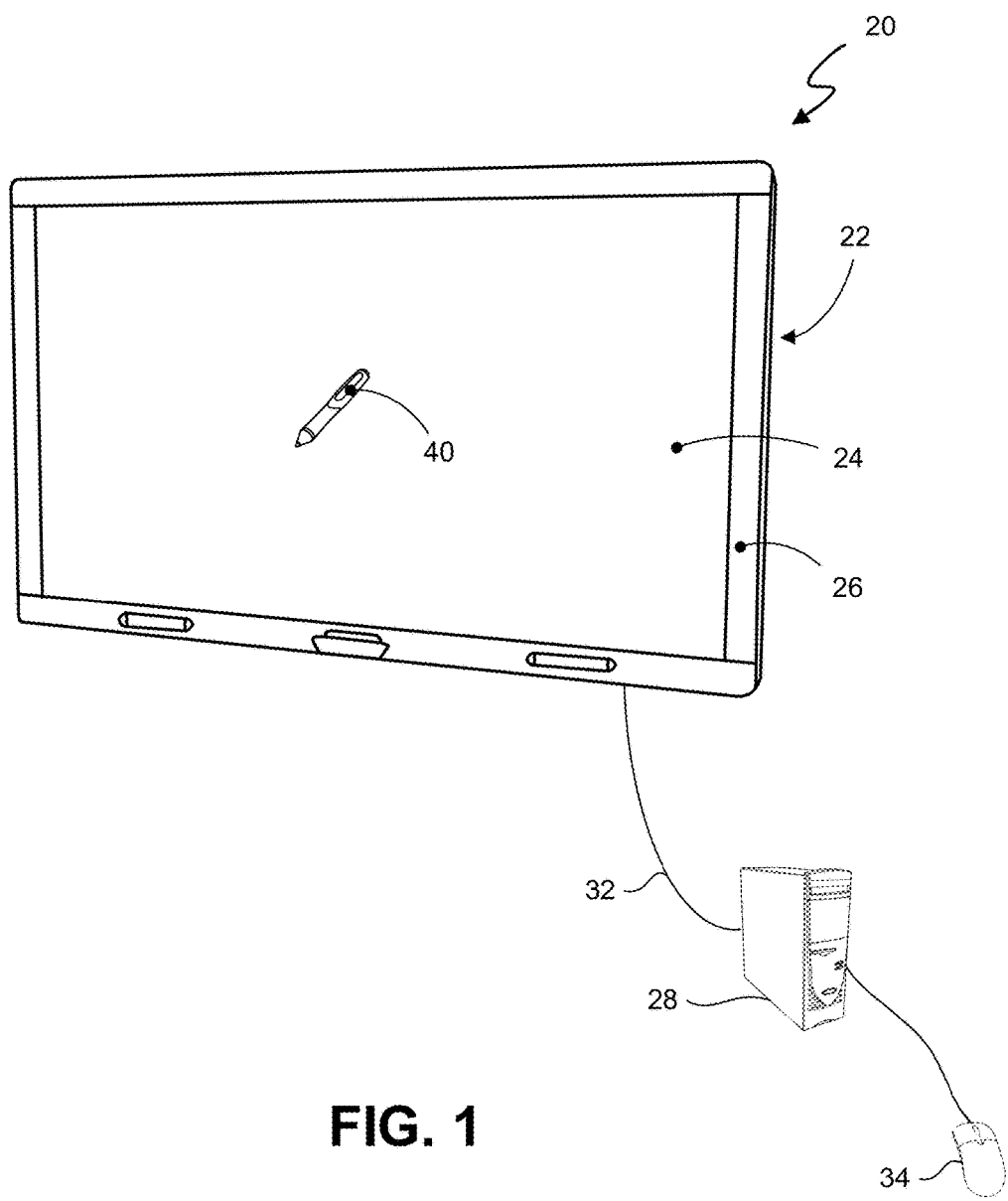
FIG. 1 is a diagram of an interactive input system.

For convenience, like numerals in the description refer to like structures in the drawings. Referring to FIG. 1, an interactive input system that allows a user to inject input such as digital ink, mouse events etc. into an executing application program is shown and is generally identified by reference numeral 20. In this embodiment, interactive input system 20 comprises an interactive board 22 mounted on a vertical support surface such as for example, a wall surface or the like or otherwise suspended or supported in an upright orientation. Interactive board 22 comprises a generally planar, rectangular interactive surface 24 that is surrounded about its periphery by a bezel 26. An image, such as for example a computer desktop is displayed on the interactive surface 24. In this embodiment, a liquid crystal display (LCD) panel or other suitable display device displays the image, the display surface of which defines interactive surface 24.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 32 or other suitable wired or wireless communication link. General purpose computing device 28 processes the output of the interactive board 22 and adjusts image data that is output to the interactive board 22, if required, so that the image presented on the interactive surface 24 reflects pointer activity. In this manner, the interactive board 22 and general purpose computing device 28 allow pointer activity proximate to the interactive surface 24 to be recorded as writing or drawing or used to control execution of one or more application programs executed by the general purpose computing device 28.

Imaging assemblies (not shown) are accommodated by the bezel 26, with each imaging assembly being positioned adjacent a different corner of the bezel. Each imaging assembly comprises an image sensor and associated lens assembly that provides the image sensor with a field of view sufficiently large as to encompass the entire interactive surface 24. A digital signal processor (DSP) or other suitable processing device sends clock signals to the image sensor causing the image sensor to capture image frames at the desired frame rate. The imaging assemblies are oriented so that their fields of view overlap and look generally across the entire interactive surface 24. In this manner, any pointer such as for example a user's finger, a cylinder or other suitable object, a pen tool 40 or an eraser tool that is brought into proximity of the interactive surface 24 appears in the fields of view of the imaging assemblies and thus, is captured in image frames acquired by multiple imaging assemblies.

When the imaging assemblies acquire image frames in which a pointer exists, the imaging assemblies convey the image frames to a master controller. The master controller in turn processes the image frames to determine the position of the pointer in (x,y) coordinates relative to the interactive surface 24 using triangulation. The pointer coordinates are then conveyed to the general purpose computing device 28 which uses the pointer coordinates to update the image displayed on the interactive surface 24 if appropriate. Pointer contacts on the interactive surface 24 can therefore be recorded as writing or drawing or used to control execution of application programs running on the general purpose computing device 28.

The general purpose computing device 28 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computing device components to the processing unit. The general purpose computing device 28 may also comprise networking capability using Ethernet, WiFi, and/or other network format, for connection to access shared or remote drives, one or more networked computers, or other networked devices. The general purpose computing device 28 is also connected to the World Wide Web via the Internet.

The interactive input system 20 is able to detect passive pointers such as for example, a user's finger, a cylinder or other suitable objects as well as passive and active pen tools 40 that are brought into proximity with the interactive surface 24 and within the fields of view of imaging assemblies. The user may also enter input or give commands through a mouse 34 or a keyboard (not shown) connected to the general purpose computing device 28. Other input techniques such as voice or gesture-based commands may also be used for user interaction with the interactive input system 20.

The general purpose computing device 28 is configured to run a web browser application that allows the general purpose computing device 28 to be connected to a remote host server (not shown) hosting a collaboration application. Similar to the general purpose computing device 28, the remote host server is a personal computer, network computer or other suitable processing device.

The collaboration application allows a collaboration session for one or more computing devices connected to the remote host server via a network connection to be established. Different types of computing devices may connect to the remote host server to join the collaboration session. Examples of such computing device include the general purpose computing device 28, laptop or notebook computers, tablets, desktop computers, smartphones professional digital assistants (PDAs) and the like. Examples of the network connection include local area networks, such an intranets, and wide area networks, such as the Internet.

One or more participants can join the collaboration session by connecting their respective computing devices to the remote host server via web browser applications running thereon. Participants of the collaboration session can all be co-located at a common site, or can alternatively be located at different sites. It will be understood that the computing devices may run any operating system such as Microsoft Windows™, Apple iOS, Apple OS X, Linux, Android and the like. The web browser applications running on the computing devices provide an interface to the remote host server, regardless of the operating system.

When a computing device user wishes to join the collaborative session, the web browser application in launched on the computing device. An address of the collaboration application running on the remote host server, usually in the form of a uniform resource locator (URL), is entered into the web browser. This action results in a collaborative session join request being sent to the remote host computer. In response, the remote host server returns code, such as HTML5 code, to the computing device. The web browser application launched on the computing device in turn parses and executes the received code to display a shared two-dimensional workspace of the collaboration application within a window provided by the web browser application.

The web browser application also displays functional menu items, buttons and the like within the window for selection by the user. Each collaboration session has a unique identifier associated with it, allowing multiple users to remotely connect to the collaboration session. The unique identifier forms part of the URL address of the collaboration session. For example, the URL "canvas.smartlabs.mobi/default.cshtml?c=270" identifies a collaboration session that has an identifier 270.

The collaboration application communicates with each computing device joined to the collaboration session, and shares content of the collaboration session therewith. During the collaboration session, the collaboration application provides the two-dimensional workspace, referred to herein as a canvas, onto which input may be made by participants of the collaboration session. The canvas is shared by all computing devices joined to the collaboration session.

Figure 2:
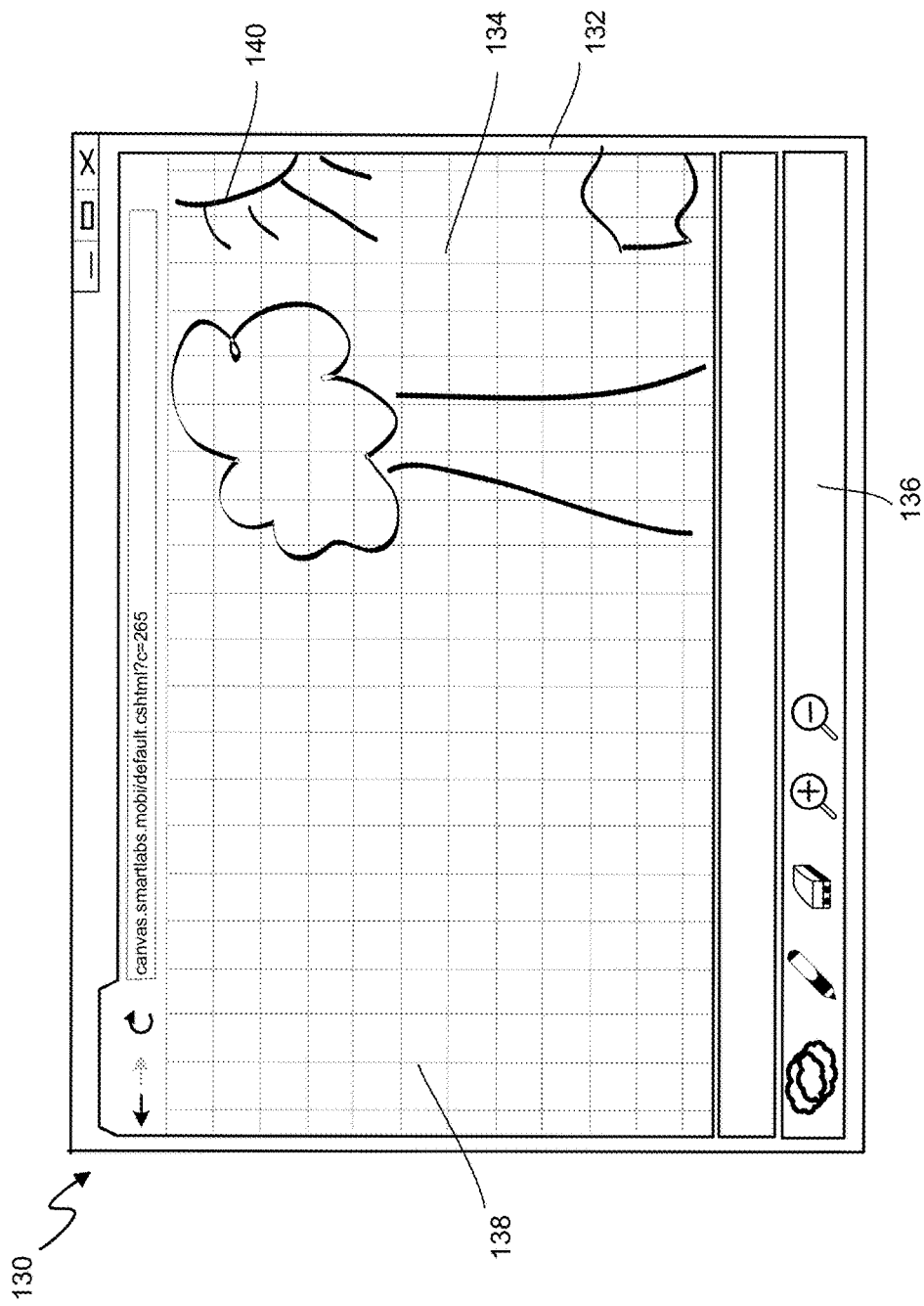
FIG. 2 is diagram of an exemplary web browser application window.

Referring to FIG. 2, an exemplary web browser application window is illustrated generally by numeral 130. The web browser application window 130 is displayed on the interactive surface 24 when the general purpose computing device 28 connects to the collaboration session. Internet browser application window 130 comprises an input area 132 in which a portion of the canvas 134 is displayed. In the example shown in FIG. 2, the portion of the canvas 134 has input thereon in the form of digital ink 140. The canvas 134 also comprises a reference grid 138, over which the digital ink 140 is applied. The web browser application window 130 also comprises a menu bar 136 providing a plurality of selectable icons, with each icon providing a respective function or group of functions.

Only a portion of the canvas 134 is displayed because the canvas 134 is configured to be extended in size within its two-dimensional plane to accommodate new input as needed during the collaboration session. As will be understood, the ability of the canvas 134 to be extended in size within the two-dimensional plane as needed causes the canvas to appear to be generally infinite in size.

Each of the participants in the collaboration application can change the portion of the portion of the canvas 134 presented on their computing devices, independently of the other participants, through pointer interaction therewith. For example, the collaboration application, in response to one finger held down on the canvas 134, pans the canvas 134 continuously. The collaboration application is also able to recognize a "flicking" gesture, namely movement of a finger in a quick sliding motion over the canvas 134. The collaboration application, in response to the flicking gesture, causes the canvas 134 to be smoothly moved to a new portion displayed within the web browser application window 130. For ease of explanation, the portion of the canvas 134 presented on the participants' computing devices will be referred to as a view. Also, the portion of the canvas that the participant has viewed in a given session is referred to as an explored area.

However, because of practical constraints associated with creating and managing the collaborative session, the canvas is not infinite. Rather, maximum boundary dimensions for the canvas are established based, at least in part, on specifications of the computing devices involved in the collaborative session. In order to reduce the effect of fixed maximum boundary dimensions, the collaborative application is configured to dynamically determine and modify a position of the boundary of the canvas, as will be described below. In this way, participants in the collaborative session can dynamically define the canvas, even though the maximum boundary dimensions of the canvas are fixed.

Figure 3A:
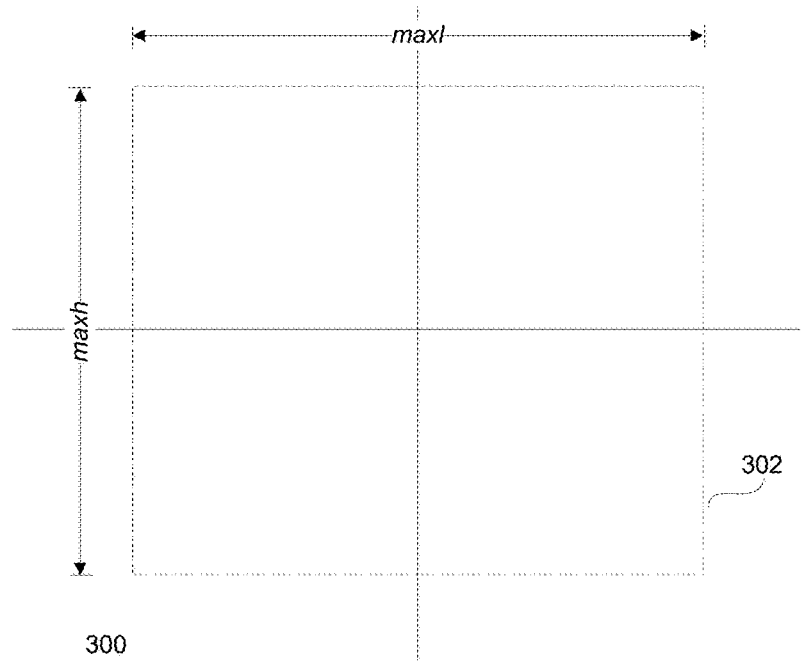
FIGS. 3a to 3e are diagrams illustrating the maximum boundary in a two dimensional coordinate space for an initial session.

Referring to FIG. 3a, a two-dimensional coordinate space for the canvas 134 is illustrated generally by numeral 300. The coordinate space includes a maximum boundary 302. The maximum boundary 302 has a predefined maximum length maxl and a predefined maximum height maxh. In this embodiment, the predefined maximum length maxl and the predefined maximum height maxh are specified in pixels. For example, the maximum length maxl is 6000 pixels and the maximum height maxh is 4000 pixels. As will be appreciated, the exact number of pixels may vary depending on the implementation and the computing devices used. The maximum boundary 302 is initially positioned about an origin of the coordinate space 300. As will be described, although the size of the maximum boundary 302 does not change, the position of the maximum boundary 302 may change based on participant interaction within the collaboration session. Changing the position of the maximum boundary provides the participants in the collaborative session with greater flexibility in creating a workspace.

Figure 3B:
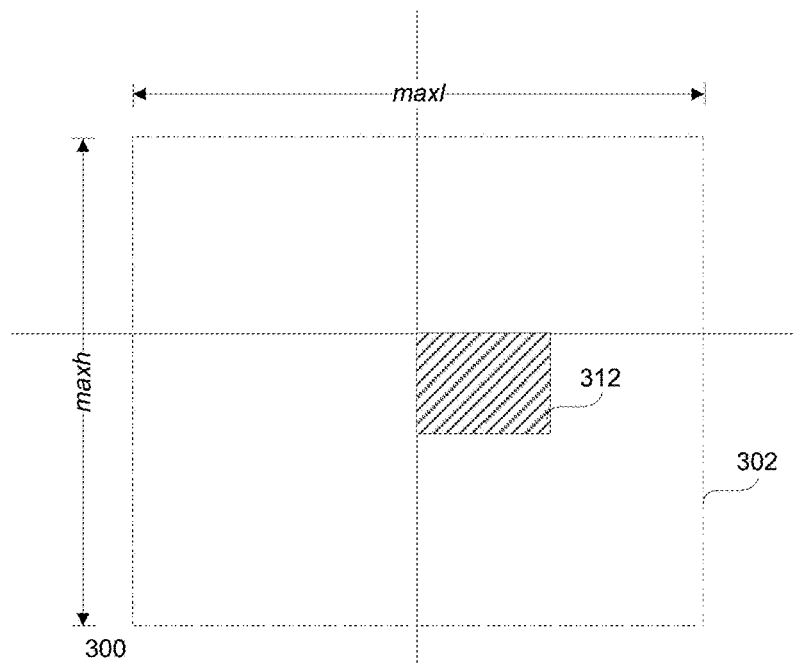

Referring to FIG. 3b, the two dimensional coordinate space 300 of FIG. 3a is shown with an initial explored area 312. In this example, the initial explored area 312 is set to a default initial explored area. The default initial explored area 312 is used for a new collaborative session in which the canvas does not yet contain any annotations. Considering that different computing devices will likely access the collaborative session, the default initial explored area 312 is sized to at least match the greatest resolution of a typical computing device. By choosing this value, it is unlikely that the default initial explored area 312 will be set too small. In this embodiment, the initial explored area 312 is positioned so that its top left corner is at the origin of the coordinate space. As will be appreciated by a person of ordinary skill in the art, the position of the default initial explored area 312 is selected based on convention and may vary depending on the implementation.

Figure 3C:
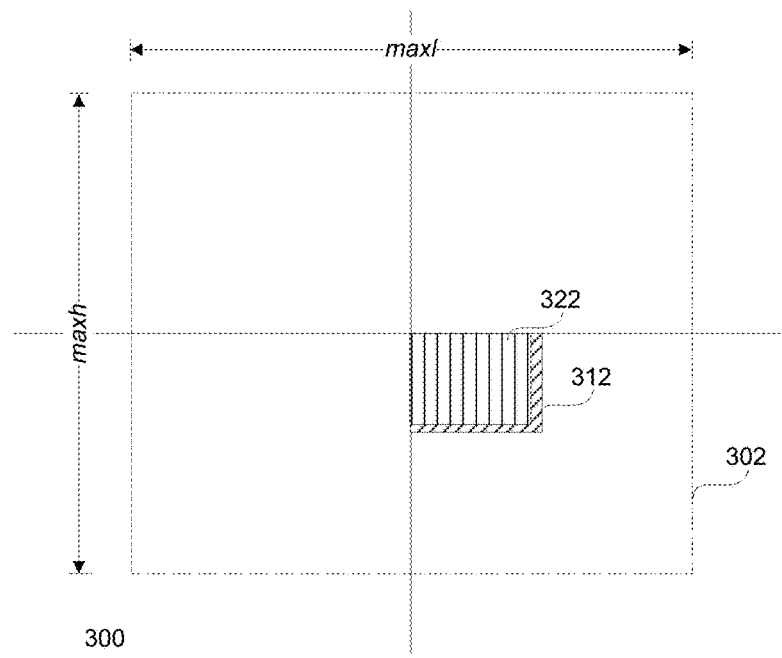

Referring to FIG. 3c, the two dimensional coordinate space 300 of FIGS. 3a and 3b is shown with an initial client view 322. The initial client view 322 is the view presented on each of the participant client devices when the participants join the collaborative session. The position of the initial client view 322 is configured similar to the default initial explored area 312. Accordingly, the initial client view 322 is positioned so that its top left corner is at the origin of the coordinate space. The size of the initial client view 322 may vary from participant to participant, depending, at least in part, on the resolution of the computing device that the participant is using to access the collaborative session. In this example the initial client view 322 is slightly smaller than the default initial explored area 312.

Figure 3D:
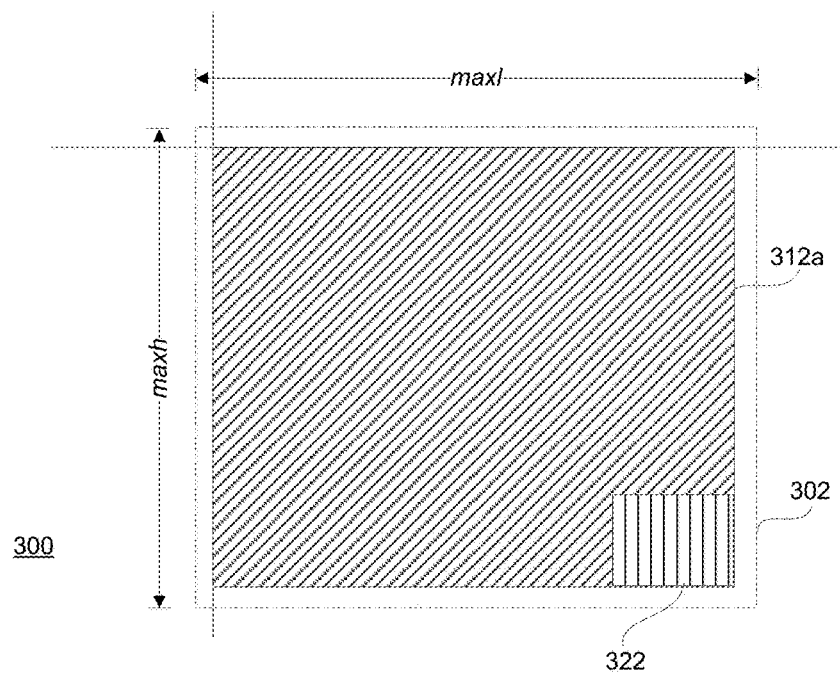

As the participants interact with the collaborative session and adjust their views, the explored area expands. The position of the maximum boundary 302 is adjusted accordingly until the size of the explored area reaches the maximum length maxl and the maximum height maxh. Referring to FIG. 3d, the two dimensional coordinate space 300 of FIGS. 3a, 3b and 3c is shown with an expanded explored view 312. As shown in FIG. 3d, the participant has moved the client view 322 to explore the canvas below and to the right of the initial client view 322 at the origin. The area explored by the participant moving the client view 322 is represented by the explored area 312. The position of the maximum boundary 302 has been adjusted accordingly. Once the size of the explored area 312 reaches the maximum length maxl, the canvas will no longer be able to be extended in the horizontal direction. Once the size of the explored area 312 reaches the maximum height maxh, the canvas will no longer be able to be extended in the vertical direction.

Figure 3E:
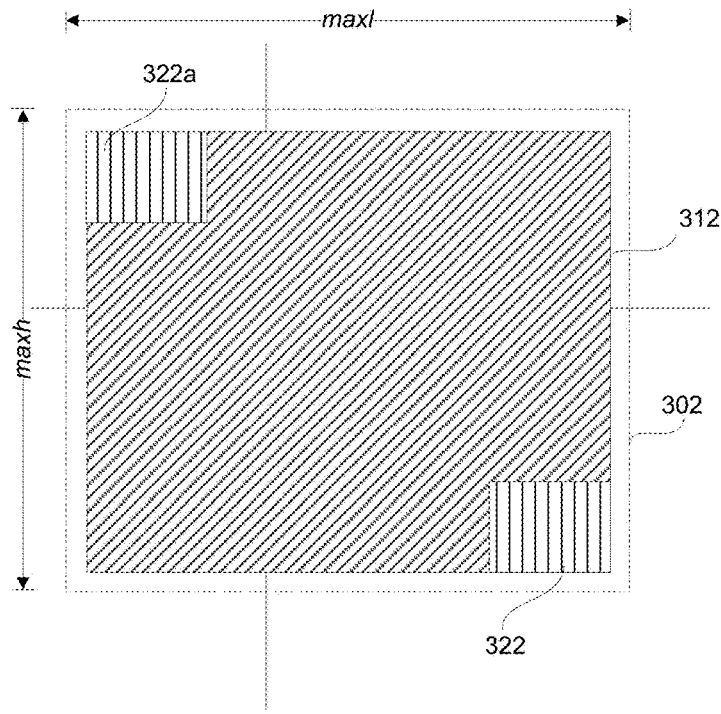

The explored area 312 represents the portion of the canvas that has been viewed by any of the participants in the collaborative session. Accordingly, the ability of one of the participants to view the canvas may be restricted by view of another one of the participants. Referring to FIG. 3e, the two dimensional coordinate space 300 of FIGS. 3a, 3b, 3c and 3d is shown with two participants in the collaborative session. Accordingly, in addition to the client view 322 described in the previous figures, a second client view 322a is shown. In this example, the second client view 322a has been moved to a position above and to the left of the origin. Accordingly, the position of the maximum boundary 302 is adjusted to accommodate the second client view 322a. In this example, the upper left corner of the maximum boundary 302 is positioned proximate the upper left corner of the second client 322a. As a result, the first client view 322 is restricted as to how far below and to the right of the origin it can be moved.

Figure 4:
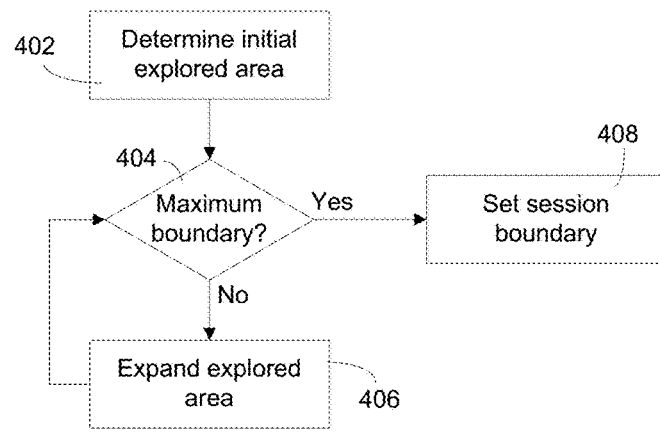
FIG. 4 is a flowchart illustrating a method for dynamically determining session boundary coordinates.

Referring to FIG. 4, a flowchart illustrating a method for dynamically determining session boundary coordinates is shown generally by numeral 400. The session boundary coordinates represent coordinates of the maximum boundary 302 when the length of the explored area reaches the maximum length and the height of the explored area reaches the maximum height. At step 402, the initial explored area 312 is determined. At step 404, it is determined whether or not the size of the explored area 312 has reached the maximum boundary 302. In this embodiment, the length of the explored area 312 is compared the maximum length maxl of the maximum boundary 302 and the height of the explored area 312 is compared the maximum height maxh of the maximum boundary 302.

If it is determined that the size of the explored area 312 has not yet reached the maximum boundary, then at step 406, the participants in the collaborative session are free to adjust their view beyond the current explored area 312. The explored area is expanded as the participants adjust their views.

Returning to step 404, if it is determined that the size of the explored area 312 has reached the maximum boundary, then at step 408, the coordinates of the explored area 312 are set as a session boundary. The collaborative application will inhibit any of the participants from adjusting their view to extend beyond the session boundary.

The session boundaries in the horizontal and vertical directions can be established independently. That is, if the horizontal size of the explored area 312 has reached the maximum length maxl but the vertical size of the explored area 312 has not reached the maximum height maxh, the collaborative application will inhibit any of the participants from adjusting their view in the horizontal direction but not in the vertical direction. Similarly, if the vertical size of the explored area 312 has reached the maximum height maxh but the horizontal size of the explored area 312 has not reached the maximum length maxl, the collaborative application will inhibit any of the participants from adjusting their view in the vertical direction but not in the horizontal direction.

The session boundary, as described above is maintained for the collaborative session. At the end of the session, that is when the last participant exits the collaborative session, the canvas details are stored in memory. These details include any annotations added by the participants during the collaborative session.

In this embodiment, the session boundary is not stored along with the canvas details. Rather, the session boundary for any subsequent session is determined dynamically during the subsequent session. As described above, for a new canvas, the initial explored area 312 is set to the default initial explored area 312. However, when a new session is started for a previously saved canvas, the initial explored area 312 is determined based on the canvas details. In this embodiment, the initial explored area 312 is determined as the minimum space required to present all of the annotations in the saved canvas details.

Figure 5A:
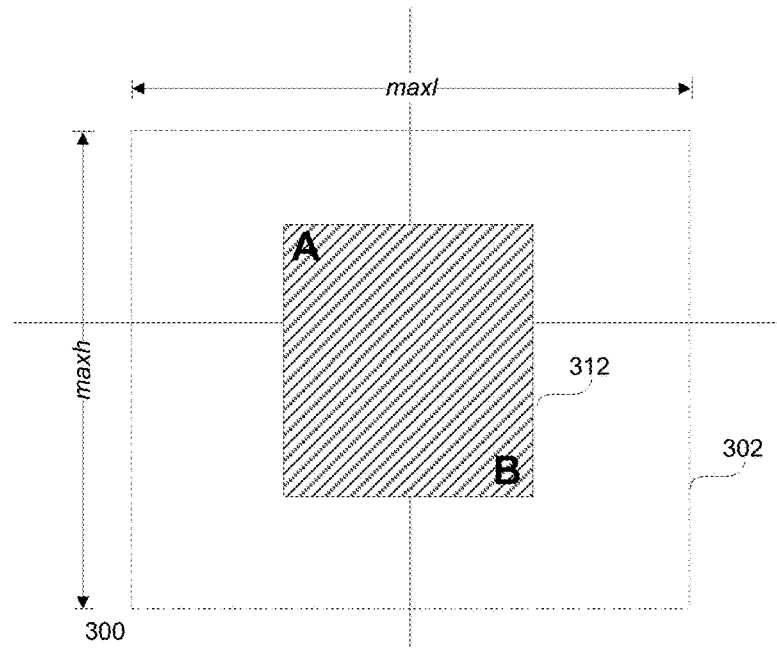
FIGS. 5a and 5b are diagrams illustrating the maximum boundary in a two dimensional coordinate space for a session based on a previously stored session.

Referring to FIG. 5a, a two dimensional coordinate space 300 is shown with an initial explored area based on previously stored annotations. As shown, in a previous collaboration session, the canvas has been annotated with a first annotation A above and to the left of the origin and a second annotation B below and to the right of the origin. Accordingly, the initial explored area 312 is established to include from the first annotation A and the second annotation B. In this example, the initial explored area 312 is smaller than the maximum boundary 302, and the participants are free to adjust their views and expand the canvas.

Figure 5B:
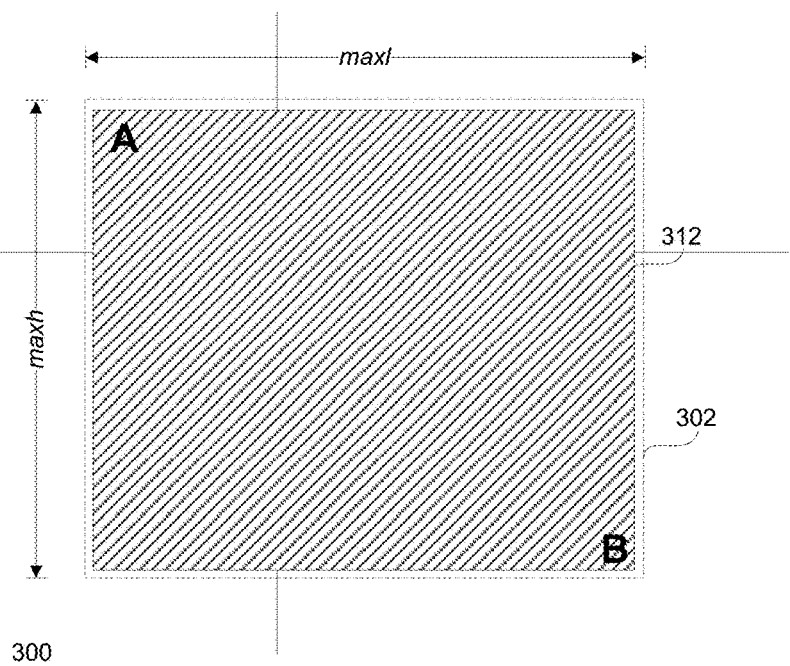

Referring to FIG. 5b, a two dimensional coordinate space 300 is shown with an initial explored area based on previously stored annotations. As shown, in a previous collaboration session, the canvas has been annotated with a first annotation A above and to the left of the origin and a second annotation B below and to the right of the origin. Accordingly, the initial explored area 312 is established to include from the first annotation A and the second annotation B. In this example, the initial explored area 312 is the same size as the maximum boundary 302. Accordingly, although the participants are free to adjust their view and, they cannot do so beyond the initial explored area 312.

As will be appreciated, limiting the canvas to a predetermined size as described above, improves the user experience by facilitating seamless interaction with the canvas while dynamically defining the location of a boundary for the canvas. Specifically, limiting the size of the canvas available to the participants facilitates improved processing by the computing devices. Dynamically defining the boundary location allows the user to have flexibility, even though the maximum size of the explored area of the canvas is limited.

In the embodiments described above, the initial explored area for a new canvas is sized to the greatest resolution of the computing devices likely to access the collaborative session. In an alternative embodiment, the initial explored area for a new canvas is dynamically created and sized to match the resolution of a first participant to access collaborative session. If a new participant using a device with a greater resolution subsequently joins the session, the initial explored area is dynamically expanded to match the resolution of the new device, unless the first participant has already expanded the explored area to facilitate the new participant.

In an alternative embodiment, the remote host server downloads a software application (also known as a plugin) that runs within the web browser on the client side i.e., the user's computing device. This application can perform many operations without the need for communication with the remote host server.

In another alternative embodiment the collaboration application is implemented as a standalone application running on the user's computing device. The user gives a command (such as by clicking an icon) to start the collaboration application. The application collaboration starts and connects to the remote host server by following the predefined address of the server. The application displays the canvas to the user along with the functionality accessible through buttons or menu items.

Although in embodiments described above the interactive input system is described as utilizing an LCD device for displaying the images, those skilled in the art will appreciate that other types of interactive input systems may be used. For example, an interactive input system that includes a boom assembly to support a short-throw projector such as that sold by SMART Technologies ULC under the name "SMART UX60", which projects an image, such as for example, a computer desktop, onto the interactive surface 24 may be employed.

Although embodiments have been described above with reference to the accompanying drawings, those of skill in the art will appreciate that variations and modifications may be made without departing from the scope thereof as defined by the appended claims.

What is claimed is:

1. A method for dynamically determining session boundary coordinates within a canvas that is provided as a two-dimensional digital workspace, the method comprising:
   generating, at a host server hosting a collaboration session, the canvas for presentation by one or more computing devices participating in the collaboration session, wherein the canvas is configured to be shared by users operating the one or more computing devices;
   setting an initial explored area of the canvas for viewing at the one or more computing devices;
   displaying the initial explored area associated within one or more fields of view of the canvas presented at the one or more computing devices;
   annotating the initial explored area;
   in response to detecting, at the host server, one or more interactions with at least a portion of the canvas presented at the one or more computing devices:
      until the initial explored area of the canvas achieves a maximum size:
         upon detecting that the one or more interactions relate to user-provided adjustments of the initial explored area to create a second explored area of the canvas displayed within the one or more fields of view presented at the one or more computing devices, annotating the second explored area as part of the initial explored area,
         monitoring that the initial explored area of the canvas is within the maximum size of the canvas, and
         upon determining that the initial explored area of the canvas has reached the maximum size of the canvas based on expansion of the second explored area produced from user-provided adjustments, setting coordinates of the initial explored area of the canvas as session boundary coordinates of the canvas, and
         upon detecting additional user-provided adjustments of the initial explored area of the canvas, when the initial explored area of the canvas has reached the maximum size of the canvas and the coordinates of the initial explored area of the canvas are set as the session boundary coordinates of the canvas, preventing alteration of the initial explored area of the canvas beyond the session boundary coordinates the canvas.

2. The method of claim 1, wherein the initial explored area is expanded in response to detecting the user-provided adjustments of the initial explored area of the canvas to include previously unexplored areas of the canvas.

3. The method of 1, further comprising:
   inhibiting one or more users of the collaboration session operating the one or more computing devices from adjusting the respective fields of view of the one or more users beyond the session boundary coordinates of the canvas.

4. The method of claim 1, wherein the session boundary coordinates of the canvas are deleted upon termination of a collaboration session.

5. The method of claim 4, wherein annotations created by the one or more users during the collaboration session are stored in memory upon the termination of the collaboration session.

6. The method of claim 1, wherein the initial explored area is defined based at least greater than or equal to a greatest resolution of the one or more computing devices likely to access the canvas.

7. The method of claim 1, wherein the initial explored area is based on a resolution of the one or more computing devices accessing the canvas during a collaboration session.

8. The method of claim 5, wherein the initial explored area is defined based on a minimum area covered for accommodating the annotations stored in the memory from a previous collaboration session.

9. A non-transitory computer readable medium having stored thereon instructions for determining session boundary coordinates within a canvas that is provided as a two-dimensional digital workspace, wherein the instructions when executed by a host server, cause the host server to:
   generate, at the host server hosting a collaboration session, the canvas for presentation by one or more computing devices participating in the collaboration session, wherein the canvas is configured to be shared by users operating the one or more computing devices;
   set an initial explored area of the canvas for display within one or more fields of view presented at the one or more computing devices;
   annotate the initial explored area;
   upon detecting user-provided adjustments of the initial explored area of the canvas to create a second explored area of the canvas displayed within the one or more fields of view presented at the one or more computing devices, annotate the second explored area as part of the initial explored area;
   upon determining that the initial explored area of the canvas has reached a maximum size of the canvas based on expansion of the second explored area produced from the user-provided adjustments, set coordinates of the initial explored area of the canvas as session boundary coordinates of the canvas; and
   upon detecting additional user-provided adjustments of the initial explored area of the canvas, prevent alteration of the session boundary coordinates of the canvas.

10. The non-transitory computer readable medium of claim 9, wherein the initial explored area is expanded in response to detecting the user-provided adjustments of the initial explored area of the canvas to include previously unexplored areas of the canvas.

11. The method of claim 9, further comprising instructions to:
   inhibit one or more users of the collaboration session operating the one or more computing devices from adjusting the respective fields of view of the one or more users beyond the session boundary coordinates of the canvas.

12. The non-transitory computer readable medium of claim 9, wherein the session boundary coordinates of the canvas are deleted upon termination of a collaboration session.

13. The non-transitory computer readable medium of claim 12, wherein annotations created by the one or more users during the collaboration session are stored in memory upon the termination of the collaboration session.

14. The non-transitory computer readable medium of claim 9, wherein the initial explored area is defined based at least greater than or equal to a greatest resolution of the one or more computing devices likely to access the canvas.

15. The non-transitory computer readable medium of claim 9, wherein the initial explored area is based on a resolution of the one or more computing devices accessing the canvas during a collaboration session.

16. The non-transitory computer readable medium of claim 13, wherein the initial explored area is defined based on a minimum area covered for accommodating the annotations stored in the memory from a previous collaboration session.

17. A host server comprising:
a communication interface for communicating with one or more computing devices:
memory for storing instructions; and
a processor configured to execute the instructions which cause the host server to:
set an initial explored area of the canvas for display within one or more fields of view presented at the one or more computing devices, wherein the canvas is provided as a two-dimensional digital workspace for collaboration by users participating in a collaboration session and operating the one or more computing devices;
annotate the initial explored area;
upon detecting user-provided adjustments of the initial explored area to create a second explored area of the canvas displayed within the one or more fields of view presented at the one or more computing devices, annotate the second explored area as part of the initial explored area;
upon determining that the initial explored area of the canvas reaches a maximum size of the canvas based on expansion of the second explored area produced from the user-provided adjustments, set coordinates of the initial explored area of the canvas as session boundary coordinates of the canvas; and
upon detecting additional user-provided adjustments of the initial explored area of the canvas, prevent alteration of the session boundary coordinates of the canvas.

18. The method of claim 1, wherein the maximum size includes a maximum length and a maximum height, wherein the maximum length is selected independently of the maximum height.

19. The method of claim 1, wherein the one or more computing devices includes at least one of: a tablet computer, a laptop computer, a smartphone, a personal digital assistant, and an interactive input system.

20. The method of claim 1, wherein the initial explored area is defined based on a first resolution of the first computing device accessing the canvas, further comprising:
upon detecting that a second computing device with a second resolution greater than the first resolution is accessing the canvas, modifying the initial explored area to accommodate the second resolution of the second computing device, the first computing device and the second computing device included in the one or more computing devices.

* * * * *